United States Patent

Morrison et al.

[15] 3,679,691

[45] July 25, 1972

[54] PYRIDYL β-KETOSULFOXIDES AND SULFONES

[72] Inventors: Glenn C. Morrison, Dover; John Shavel, Jr., Mendham, both of N.J.

[73] Assignee: Warner-Lambert Company, Morris Plains, N.J.

[22] Filed: May 21, 1970

[21] Appl. No.: 39,557

Related U.S. Application Data

[63] Continuation-in-part of Ser. No. 773,941, Nov. 6, 1968, abandoned.

[52] U.S. Cl. ................. 260/294.8 F, 260/294.8 G, 424/263
[51] Int. Cl. ....................................................... C07d 31/50
[58] Field of Search ......................... 260/294.8 F, 294.8 G

[56] References Cited

OTHER PUBLICATIONS

Transplantation Proceedings, Vol. 1, No. 1, pp. 106–112, (Mar.) 1969
Science News, Vol. 94, 319, Sept. 28, 1968
Science News, Vol. 95, 457–459, May 10, 1969

*Primary Examiner*—Alan L. Rotman
*Attorney*—Albert H. Graddis, Henry E. Millson, Jr., Frank S. Chow, Neil D. Edwards and Anne M. Kelly

[57] ABSTRACT

The present invention relates to pyridyl β-ketosulfoxides and sulfones. These compounds may be represented by the following structural formulas:

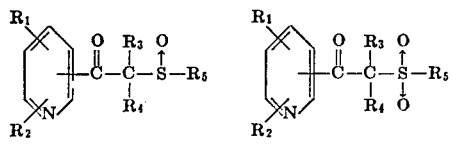

wherein $R_1$ and $R_2$ may be hydrogen, lower alkyl, cycloalkyl, lower alkenyl, aryl, substituted aryl, aralkyl, substituted aralkyl, heterocyclic, substituted heterocyclic, acyl, halogen, lower alkoxy, nitro, mercapto, lower alkylthio, hydroxy, amino, lower alkylamino, dilower alkylamino and the like. $R_3$ and $R_4$ may be hydrogen, lower alkyl or aryl. $R_5$ may be alkyl of up to 12 carbon atoms, aryl, substituted aryl, heterocyclic or substituted heterocyclic. They are prepared by reacting an ester of the pyridine carboxylic acid with dimethylsulfoxide or dimethylsulfone in the presence of a strong base. These compounds are useful as immunosuppressive agents.

21 Claims, No Drawings

PYRIDYL β-KETOSULFOXIDES AND SULFONES

This application for U.S. Letters Patent is a continuation-in-part of our copending application U.S. Ser. No. 773,941, filed Nov. 6, 1968, now abandoned.

The present invention relates to new and useful heterocyclic compounds; and more particularly, to new and novel pyridyl β-ketosulfoxides (I) and pyridyl β-ketosulfones (II). These compounds have the following structural formulas:

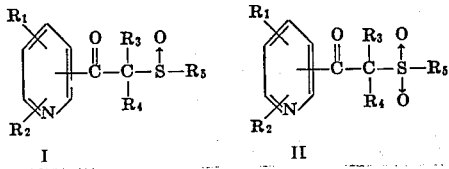

wherein $R_1$ and $R_2$ are each hydrogen, lower alkyl, cycloalkyl, lower alkenyl, aryl, substituted aryl, aralkyl, substituted aralkyl, heterocyclic, substituted heterocyclic, acyl, halogen, lower alkoxy, nitro, mercapto, lower alkylthio, hydroxy, amino, lower alkylamino, dilower alkylamino and the like. $R_3$ and $R_4$ may be hydrogen, alkyl, or aryl; $R_5$ may be alkyl of up to 12 carbon atoms, aryl, substituted aryl, heterocyclic, or substituted heterocyclic.

As used throughout the specification and claims:

The term "lower alkyl" and the lower alkyl portion of lower alkoxy embraces both straight and branched chain alkyl radicals containing from one to six carbon atoms, for example, methyl, ethyl, propyl, isopropyl, n-butyl, n-amyl, n-hexyl, 2-ethylbutyl, 2,3-dimethylbutyl, and the like; the term "lower alkenyl" embraces straight and branched chain alkenyl radicals containing from two to six carbon atoms, for example, vinyl, allyl, 1-butenyl, 1-hexenyl, 2,3-di-methyl-1-butenyl, 2-ethyl-1-butenyl and the like; the term "cycloalkyl" encompasses saturated monocyclic groups having from three to eight carbon atoms such as cyclopropyl, cyclobutyl, cyclopentyl, cyclohexyl, cycloheptyl and cyclooctyl; the term "aryl" denotes a monocyclic aromatic hydrocarbon of six to eight carbon atoms, such as phenyl, tolyl and the like; the term "aralkyl" encompasses lower alkyl groups in which aryl as defined above is substituted for a hydrogen atom, such as for example, benzyl, phenethyl and the like; the term "substituted aryl" means an aryl as defined above in which one or more of the hydrogen atoms of the aryl portion have been substituted by a functional group such as halogen, hydroxyl, lower alkyl, trifluoromethyl, amino, substituted amino, lower alkoxy and the like; the term "substituted aralkyl" means those aralkyl groups having further substituents in their ring portions, such as halogen, hydroxyl, lower alkyl, trifluoromethyl, amino, substituted amino, lower alkoxy and the like; the term "heterocyclic" encompasses those 5 and 6 member heterocyclic rings having at least one hetero atom in the ring such as nitrogen, oxygen or sulfur, for example, pyridyl, thienyl, furyl and the like; the term "substituted heterocyclic" are those heterocyclic radicals as defined above having further substituents in their ring portions, for example, by groups such as hydrogen, halogen, lower alkyl and lower alkoxy and the like; the term "acyl" means those hydrocarbon carboxylic acids of less than 12 carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acids), the monocyclic aryl lower alkanoic acids (e.g., phenylacetic and β-phenylpropionic acid), the cycloalkane carboxylic acids and the cycloalkene carboxylic acids; the term "halogen" encompasses all four halogens, such as fluorine, bromine, chlorine and iodine.

The symbols $R_1$, $R_2$, $R_3$, $R_4$ and $R_5$ as used hereinafter have the same meaning as described above.

The biological profile of these compounds is as follows:

These compounds inhibit those immune reactions classified as cell-mediated, delayed type hypersensitivities. These latter include: the late secondary migratory lesions in rats injected with Freund's adjuvant, in accordance with the techniques described in Brit. J. Pharmacol. 21: 127-136 and Brit. J. Pharmacol. 24: 632-640 (1965); the sensitized response to bacterial endotoxin shown in the spleen-cell assay, Jerne et al., Cell-bound Antibodies, Wistar Institute Press, 1963, p. 109; skin transplant rejection in mice and rats and mammary gland rejection in rats, Billingham, Transplantation of Cells and Tissues, Wistar Institute Press, 1961, p. 1; contact and protein hypersensitivities in guinea pigs, rabbits and rats, Uhr, Physiol. Rev. 46: 359-419. The compounds of this invention, as well as their corresponding acid addition salts, N-oxides and quaternary ammonium salts, showed, at a dosage range of about 1 to 1,000 mg/kg, typically 25 to 100 mg/kg, three or four times daily, orally or by injection, depending on the host, effectiveness in suppressing these various expressions of the delayed hypersensitivity immunological response.

Among the delayed hypersensitivity immunological responses, in which the compounds of this invention are indicated, are for example, rheumatoid arthritis, ulcerative colitis, allergies, skin and organ transplants, systemic lupus, glomerular nephritis and the like. As far as toxicity is concerned, these compounds of this invention have extremely low toxicity, for example, oral administration at a dose of 5 g/kg or intravenous injection at a dose of 1 g/kg to mice produces no deaths.

In order to use these compounds, they may be combined with inert pharmaceutical excipients, such as lactose, mannitol, starch, and formulated into dosage forms such as tablets, capsules and the like. For parenteral administration, these compounds may be formulated with an inert, parenterally acceptable vehicle, such as water, saline, sesame oil and the like. These various pharmaceutical dosage forms are compounded by methods well known to the pharmacist's art.

According to the present invention, the compounds are prepared by reacting an ester of the appropriate pyridine carboxylic acid of the formula:

III

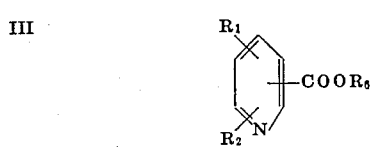

with dimethylsulfoxide or dimethylsulfone in the presence of a strong base such as sodium amide, sodium hydride or potassium t-butoxide. In formula III, $R_6$ is alkyl. When the pyridine derivative III is reacted with a sulfoxide, the compounds produced correspond to I, whereas reaction with a sulfone produces compounds of type II. Generally speaking, the reaction is effected with or without solvent at a temperature of about 20° to 90° C. The reaction product is recovered by conventional techniques.

An alternative route for the compounds of this invention involves treating an $R_1$, $R_2$ substituted bromoacetylpyridine of the formula:

IV

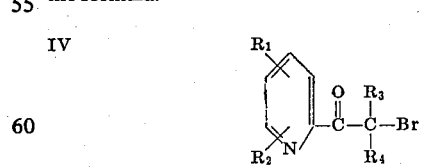

with a mercaptan to give a thioether of the formula:

V

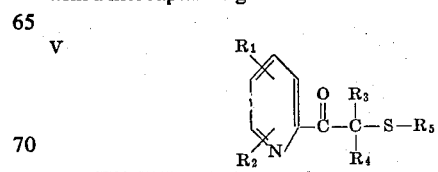

The resulting thioethers are then oxidized with one equivalent of an oxidizing agent, such as, perbenzoic acid, sodium metaperiodate, sodium hypochlorite, potassium permanganate, hydrogen peroxide, m-chloroperbenzoic acid and the like.

Although in the following examples, a representative number of compounds which fall within the scope of this invention are illustrated, it will be obvious to one skilled in the art that the process of this invention is adaptable for all the compounds of this invention using the appropriate starting materials; for example, starting materials wherein $R_1$ and $R_2$ are lower alkyl, halogen, etc., which are readily available and can be converted into the corresponding carboxylates using conventional techniques. The carboxylate can, therefore, be reacted in accordance with the process of this invention to produce the compounds of this invention.

The compounds of our invention may be converted into their pharmaceutically acceptable non-toxic acid addition and quaternary ammonium salts by conventional procedures. Exemplary of non-toxic acid addition salts are those formed with acetic, maleic, fumaric, succinic, tartaric, citric, malic, cinnamic, sulfonic, hydrochloric, hydrobromic, sulfuric, phosphoric and nitric acids. The acid addition salts may be prepared in the conventional manner by treating a solution or suspension of the free base in an organic solvent with the desired acid, and then recovering the salts which form by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate, or methyl p-toluenesulfonate. The N-oxides are prepared by treating the free base with an oxidizing agent such as hydrogen peroxide. The following examples are included in order further to illustrate the invention. All temperatures are given in degrees centigrade.

EXAMPLE 1

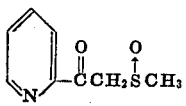

2-[(Methylsulfinyl)acetyl]pyridine

A mixture of 24 g. of sodium hydride dispersion in mineral oil and 270 ml. of dimethylsulfoxide was heated at 70° for 1 hr. To the resulting solution, 36.2 g. of ethyl picolinate was added with cooling such that the temperature remained below 30°. After the addition had been completed, stirring was continued for 1 hr. at room temperature. The reaction mixture was poured into 500 ml. of ice water, filtered, and the pH of the solution was adjusted to 8 with concentrated hydrochloric acid. The solution was extracted with four 500 ml. portions of chloroform. The combined chloroform layers were dried over sodium sulfate and the solvent was removed. Finally, the residue was stripped under high vacuum on the steam bath. Crystallization of the residue from ethyl acetate gave 25 g. (57 percent) of a solid, m.p. 69.5°–71.5°. Further recrystallization gave an analytical sample, m.p. 82° to 83°.

Anal. Calcd. for $C_8H_9NO_2S$: C, 52.44; H, 4.95; N, 7.64; S, 17.50. Found: C, 52.51; H, 4.93; N, 7.69; S, 17.68.

EXAMPLE 2

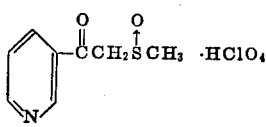

3-[(Methylsulfinyl)acetyl]pyridine Perchlorate

Subjection of 36.2 g. of ethyl nicotinate to the procedure used for the 2-isomer gave an oil. The oil was dissolved in 120 ml. of ethanol and 11 ml. of 70 percent perchloric acid was added with cooling. There was deposited 33 g. of a solid.

Recrystallization from 100 ml. of water gave 18.5 g. (27 percent) of a solid, m.p. 139°–140° dec. Further recrystallization afforded an analytical sample, m.p. 140°–141° dec.

Anal. Calcd. for $C_8H_9NO_2S \cdot HClO_4$: C, 33.87; H, 3.55; N, 4.94; S, 11.30; Cl, 12.50. Found: C, 34.02; H, 3.42; N, 4.78; S, 11.23; Cl, 12.42.

EXAMPLE 3

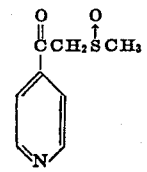

4-[(Methylsulfinyl)acetyl]pyridine

Subjection of 34.2 g. of methyl isonicotinate to the procedure for the 2-isomer gave 17.8 g. (39 percent) of a solid, m.p. 82°–84°. Further recrystallization gave an analytical sample, m.p. 84°–85.5°.

Anal. Calcd. for $C_8H_9NO_2S$: C, 52.44; H, 4.95; N, 7.64; S, 17.50. Found: C, 52.52; H, 4.89; N, 7.66; S, 17.50. m.p.

EXAMPLE 4

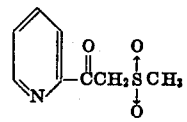

2-[(Methylsulfonyl)acetyl]pyridine

A mixture of 15.4 g. of 55 percent sodium hydride dispersion in mineral oil, 33.2 g. of dimethylsulfone, 40 ml. of dimethylsulfoxide and 80 ml. of dimethoxyethane was heated at 75° for 2 hr. A solution of 24.8 g. of ethyl picolinate in 40 ml. of dimethoxyethane was added with cooling such that the temperature remained below 25°. The mixture was stirred at room temperature for 1 hr. and poured into 400 ml. of ice water. The mixture was filtered and the pH was adjusted to 6 with concentrated hydrochloric acid. On standing there was deposited 17.7 g. (55 percent) of a solid, m.p. 102°–104.5°. Recrystallization from benzene gave an analytical sample, m.p. 110°–111°.

Anal. Calcd. for $C_8H_9NO_3S$: C, 48.23; H, 4.55; N, 7.02; S, 16.09. Found: C, 48.50; H, 4.69; N, 7.02; S, 16.14.

EXAMPLE 5

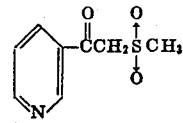

3-[(Methylsulfonyl)acetyl]pyridine

Subjection of 15.2 g. of ethyl nicotinate to the procedure for the 2-isomer gave on extraction with chloroform 15 g. of an oil. Trituration of the oil with ether afforded, after recrystallization from ethyl acetate, 4.8 g. (24 percent) of a solid, m.p. 84°–85.

Anal. Calcd. for $C_8H_9NO_3S$: C, 48.23; H, 4.55; N, 7.02; S, 16.09. Found: C, 48.22; H, 4.66; N, 7.10; S, 16.04.

EXAMPLE 6

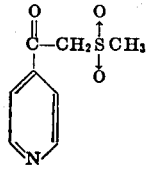

4-[(Methylsulfonyl)acetyl]pyridine

Subjection of 20.6 g. of methyl isonicotinate to the procedure for the 2-isomer gave on extraction with chloroform 12.0 g. of a solid. Recrystallization from ethyl acetate afforded 8.1 g. (27 percent) of a solid, m.p. 114°–116°. Further recrystallization gave an analytical sample, m.p. 116°–117°.

Anal. Calcd. for $C_8H_9NO_3S$: C, 48.23; H, 4.55; N, 7.03; S, 16.09. Found: C, 48.39; H, 4.49; N, 7.26; S, 16.34.

EXAMPLE 7

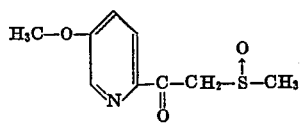

5-Methoxy-2-[(methylsulfinyl)acetyl]pyridine

Subjection of ethyl 5-methoxypicolinate [method of Rec. Trav. Chim., 77, 249 (1958)] to the procedure for the 5-unsubstituted analog gave a 45 percent yield of almost colorless material, m.p. 92°–94°. Several recrystallizations from ethyl acetate : Skellysolve C gave the analytical material, m.p. 93°–94.

Anal. Calcd. for $C_9H_{11}NO_3S$: C, 50.69; H, 5.20; N, 6.57; S, 15.04. Found: C, 50.95; H, 5.32; N, 6.77; S, 15.27.

EXAMPLE 8

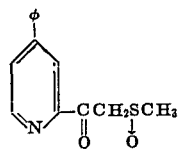

2-[(Methylsulfinyl)acetyl]-4-phenylpyridine

Subjection of ethyl 4-phenyl picolinate [method of Case and Kaspar, J. Am. Chem. Soc., 78, 5842 (1956)] to the procedure for the 4 unsubstituted isomer gave the analogous material, m.p. 91°–92° (from ethyl acetate : Skellysolve C) in 20–25 percent yield.

Anal. Calcd. for $C_{14}H_{13}NO_2S$: % C, 64.84; H, 5.05; N, 5.40; S, 12.36. Found: C, 64.96; H, 5.10; N, 5.35; S, 12.36.

EXAMPLE 9

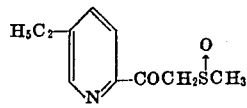

5-Ethyl-2-[(methylsulfinyl)acetyl]pyridine

Subjection of ethyl 5-ethyl picolinate [method of Helv. Chim. Acta, 37, 1391 (1954)] to the procedure for the 5-unsubstituted analog gave a 75 percent yield of tan crystals, m.p. 67°–69. Several recrystallizations from ethyl acetate : Skellysolve C gave the colorless analytical material, m.p. 70°–71°.

Anal. Calcd. for $C_{10}H_{13}NO_2S$: % C, 56.85; H, 6.20; N, 6.63; S, 15.18. Found: C, 56.96; H, 6.24; N, 6.54; S, 15.01.

EXAMPLE 10

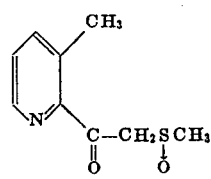

3-Methyl-2-[(methylsulfinyl)acetyl]pyridine

Subjection of ethyl 3-methyl picolinate [method of Cantwell and Brown, J. Am. Chem. Soc., 74, 5967 (1962)] to the procedure for the 3-unsubstituted analog resulted in tan crystalline material. m.p. 86°–88°. Several recrystallizations from ethyl acetate : Skellysolve C resulted in colorless analytical material, m.p. 88°–89°.

Anal. Calcd. for $C_9H_{11}NO_2S$: C, 54.80; H, 5.62; N, 7.10; S, 16.25. Found: C, 54.92; H, 5.70; N, 7.39; S, 16.37.

EXAMPLE 11

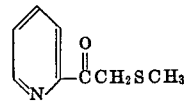

(Methylthio)methyl 2-Pyridyl Ketone

To a solution of sodium methylmercaptide prepared by the reaction of 9.2 g. of sodium with 200 ml. of ethanol followed by the addition of 25 g. of methylmercaptan was added 56.2 g. of 2-bromoacetyl pyridine hydrobromide in several portions with cooling so that the temperature did not exceed 37°. The mixture was cooled to 10° and then stirred at room temperature for 1 ½ hours. The reaction mixture was poured into 250 ml. of ice water and the aqueous solution extracted three times with 250 ml. of ether. The ether extract was dried over sodium sulfate and the solvent was removed leaving 25.2 g. of an oil. Distillation gave 15.8 g. (48 percent) of an oil $b_{0.8}$ 94°.

Anal. Calcd. for $C_8H_9NOS$: C, 57.46; H, 5.42; N, 8.38; S, 19.17. Found: C, 57.75; H, 5.71; N, 8.09; S, 19.14.

EXAMPLE 12

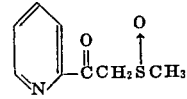

2-[(Methylsulfinyl)acetyl]pyridine

To a solution of 6.0 g. of (methylthio)methyl 2-pyridyl ketone in 120 ml. of chloroform cooled to −3° was added 7.0 g. of 85 percent m-chloroperbenzoic acid in several portions at a rate such that the temperature did not exceed +3°. An additional 60 ml. of chloroform was added during the addition of the oxidant. The mixture was stirred in the cold for 1 hour, and after filtration the chloroform solution was extracted first with 10 percent sodium carbonate solution and then with water. The chloroform extract was dried over sodium sulfate and the solvent was removed. Trituration of the residue with ether gave 2.8 g. (44 percent) of a solid m.p. 79°–80°. Recrystallization from ethyl acetate gave an analytical sample, m.p. 82°–83°.

Anal. Calcd. for $C_8H_9NO_2S$: C, 52.44; H, 4.95; N, 7.64; S, 17.50. Found: C, 52.76; H, 5.19; N, 7.50; S, 17.51.

EXAMPLE 13

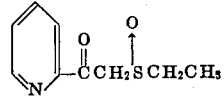

2-[(Ethylsulfinyl)acetyl]pyridine

To a solution of 18.1 g of 2-(ethylthioacetyl)pyridine in 350 ml of chloroform was added 20.0 g of m-chloroperbenzoic acid in several portions with cooling so that the temperature did not exceed 1°. An additional 100 ml of chloroform was added and the mixture stirred in the cold for 2 hrs. The reaction mixture was filtered and extracted with 10 percent sodium carbonate solution and water. The chloroform solution was dried over sodium sulfate and the solvent was removed. There was obtained 14.2 g (72 percent) of an oil which was chromatographed on Silica gel. Eltuion with 25 percent methylene chloride in ethyl acetate and pure ethyl acetate followed by recrystallization from ether gave an analytical sample mp. 43°–44°.

Anal. Calcd for C₉H₁₁NO₂S: C, 54.80; H, 5.62; N, 7.10; S, 16.25. Found: C, 54.64; H, 5.81; N, 7.04; S, 16.17.

EXAMPLE 14

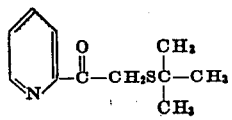

(tert-Butylthio)methyl 2-Pyridyl Ketone

To a solution of sodium ethoxide prepared by the addition of 11.6 g of sodium to 250 ml of ethanol was added 22.5 g of tert-butyl mercaptan and then 70.3 g of 2-bromoacetyl-pyridine hydrobromide in several portions so that the temperature did not exceed 34°. The mixture was stirred for 3 hrs. The reaction mixture was poured into water and extracted with methylene chloride. The combined methelene chloride extracts were treated with charcoal and the solvent was removed. Distillation gave 25.9 g (49 percent) $b_{0.3}$ 100°–103°.

Anal. Calcd for C₁₁H₁₅NOS: C, 63.12; H, 7.22; N, 6.69; S, 15.32. Found: C, 63.29; H, 7.32; N, 6.84; S, 15.25.

EXAMPLE 15

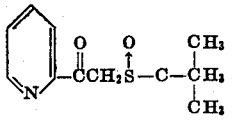

2-[(tert-butylsulfinyl)acetyl]pyridine

To a solution of 23.7 g of (tert.-butyl) thiomethyl 2-pyridyl ketone in 300 ml of chloroform was added in several portions 22.9 g of 85 percent m-chloroperbenzoic acid so that the temperature did not exceed 5°. The reaction mixture was stirred in the cold for 3 hrs. The reaction mixture was filtered and washed with 10 percent sodium carbonate solution and water. The chloroform solution was dried over sodium sulfate and the solvent was removed. The residue was chromatographed on Silica gel. Elution with mixtures of ethyl acetate and methylene chloride and pure ethylacetate afforded, after trituration with isopropyl ether, 10 g (39 percent) of a solid mp. 44°–47. Recrystallization from isopropyl ether gave an analytical sample mp. 48°–50°.

Anal. Calcd for C₁₁H₁₅NO₂S: C, 58.64; H, 6.71; N, 6.22; S, 14.23. Found: C, 58.53; H, 6.80; N, 5.98; S, 14.13.

EXAMPLE 16

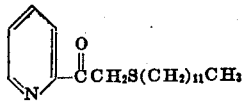

(Dodecylthio)methyl 2-Pyridyl Ketone

To a solution of sodium ethoxide prepared from the addition of 4.6 g of sodium to 100 ml of ethanol was added 20.2 g of dodecyl mercaptan, and then 28.1 g of 2-bromoacetyl-pyridine hydrobromide in several portions so that the temperature did not exceed 27°. The mixture was stirred for 2 hrs. The reaction mixture was poured into water and extracted with methylene chloride. The combined extracts were treated with charcoal and the solvent was removed. Distillation gave 9.9 g (31 percent) of an oil $b_{0.5}$189°–196°.

EXAMPLE 17

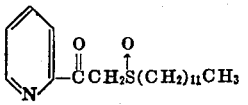

2-[(Dodecylsulfinyl)acetyl]pyridine

To a solution of 8.7 g of (dodecylthio)methyl 2-pyridyl ketone in 125 ml of chloroform was added 5.6 g of 85 percent m-chloroperbenzoic acid in several portions at a rate such that the temperature did not exceed 4°. The mixture was stirred in the cold for 3 hr. The reaction mixture was filtered and washed with 10 percent sodium carbonate solution and water. The chloroform solution was dried over sodium sulfate and treated with charcoal. Removal of the solvent followed by trituration with petroleum ether afforded 3.7 g (41 percent) of a solid mp. 62°–68°. Recrystallization from ethyl acetate gave an analytical sample mp. 65°–66°.

Anal. Calcd for C₁₉H₃₁NO₂S: C, 67.61; H, 9.26; N, 4.15; S, 9.50. Found: C, 68.45; H, 9.38; N, 3.72; S, 10.49.

EXAMPLE 18

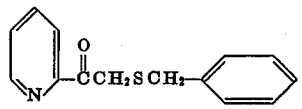

(Benzylthio)methyl 2-Pyridyl Ketone

To a solution of the sodium salt of benzylmercaptan prepared by the addition of 6.9 g of sodium with 150 ml of ethanol followed by 19.6 g of benzylmercaptan was added 42.1 g of 2-bromoacetylpyridine hydrobromide in several portions so that the temperature did not exceed 34°. The mixture was cooled to 20° and stirred at room temperature for 1 ½ hours. The reaction mixture was poured into 200 ml of ice-water and the aqueous solution was extracted with ether. The combined ether extracts were dried over odium sulfate, treated with charcoal and the solvent was removed. There remained 30.6 g (84 percent) of a solid, mp. 51°–54°. Recrystallization from ethyl acetate gave an analytical sample mp. 58°–59°.

Anal. Calcd for C₁₄H₁₃NOS: C, 69.11; H, 5.39; N, 5.76; S, 13.18. Found: C, 69.13; H, 5.42; N, 5.46; S, 13.05.

EXAMPLE 19

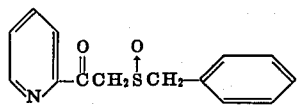

2-[(Benzylsulfinyl)acetyl]pyridine

To a solution of 10.2 g of (benzylthio)methyl 2-pyridyl ketone in 120 ml of chloroform was added 8.5 g of 85 percent m-chloroperbenzoic acid in several portions with cooling so that the temperature did not exceed 3°. The mixture was stirred in the cold for 1 ½ hours. The reaction mixture was filtered and washed with 10% sodium carbonate solution and water. The chloroform solution was dried over sodium sulfate and treated with charcoal. Removal of the solvent afforded 9.2 g (85 percent) to a solid mp. 76°–79°. Recrystallization from ethyl acetate gave an analytical sample mp. 83°–84°.

Anal. Calcd for C₁₄H₁₃NO₂S: C, 64.84; H, 5.05; N. 5.40; S, 12.36. Found C, 64.98; H, 5.09; N, 5.23; S, 12.46.

EXAMPLE 20

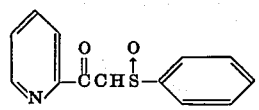

2-[(Phenylsulfinyl)acetyl]pyridine

To a solution of 18.9 g of ethyl picolinate and 19.0 g of phenyl methyl sulfoxide in 70 ml of benzene was added 5.8 g of sodium hydride (57 percent) in mineral oil) in several small portions. The reaction mixture was heated with stirring until strong foaming and reflux were observed. It was cooled and stirred at room temperature for 1 hour. After standing overnight, it was poured into 200 ml of ice-water. The resulting mixture was filtered and the pH adjusted to about 7 by the addition of 8 ml of hydrochloric acid. The mixture was extracted with chloroform. The chloroform solution was dried over sodium sulfate and the solvent was removed. Trituration with Skelly solve B gave 21.8 g (71 percent) of a solid, mp. 68°–70°. Recrystallization from diethyl ether afforded an analytical sample, mp. 70°. Anal. Calcd for $C_{13}H_{11}NO_2S$: C, 63.65; N, 4.52; N, 5.71; S, 13.07. Found: C, 63.61; H, 4.54; N, 5.95; S, 13.33.

EXAMPLE 21

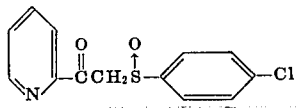

2-[4'-Chlorophenylsulfinyl)acetyl]pyridine

To a solution of 22.7 g of ethyl picolinate and 27.5 g of 4-chlorophenyl methyl sulfoxide in 80 ml of benzene was added 6.4 g of sodium hydride (57 percent in mineral oil) in several small portions. The reaction mixture was heated at 70°–75° for 30 minutes and then stirred for 3 hours. After standing overnight, the reaction mixture was poured into 200 ml of ice-water. The resulting mixture was filtered, the pH adjusted to 7 by the addition of 10 ml of concentrated hydrochloric acid, and extracted with chloroform. Removal of the solvent, followed by trituration with diethyl ether, gave 32.2 g (77 percent) of a solid, mp. 110°–111.5°. Recrystallization from ethyl acetate afforded an analytical sample, mp. 110°–111.5°.

Anal. Calcd for $C_{13}H_{10}ClNO_2S$: C, 55.82; H, 3.60; Cl, 12.67; N, 5.01; S, 11.46. Found: C, 55.99; H, 3.58; Cl, 12.60; N, 4.82; S, 11.35.

EXAMPLE 22

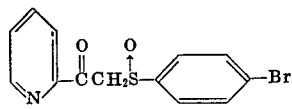

2-[4'-Bromophenylsulfinyl)acetyl]pyridine

To a solution of 22.7 g of ethyl picolinate and 33.5 g of 4-bromophenyl methyl sulfoxide in 100 ml of benzene was added 6.4 g of sodium hydride (57 percent in mineral oil) in several small portions. The reaction mixture was heated to reflux, stirred for 1 hr. at room temperature, and allowed to stand overnight. The reaction mixture was poured into 200 ml of ice-water, filtered, the pH was adjusted to 7 by the addition of 8 ml of concentrated hydrochloric acid, and extracted with chloroform. Removal of the solvent gave 28.5 g (59 percent) of a solid, mp. 123°–125°. Further recrystallization from ethyl acetate gave an analytical sample, mp. 127°–128°.

Anal. Calcd for $C_{13}H_{10}BrNO_2S$: C, 48.16; H, 3.10; Br, 24.65; N, 4.32; S, 9.89. Found: C, 48.30; H, 3.09; Br, 24.73; N, 4.22; S, 9.91.

EXAMPLE 23

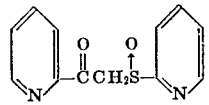

2-[(Pyridylsulfinyl)acetyl]pyridine.

To a solution of 10.9 g of crude (2-mercaptopyridyl) methyl 2'-pyridyl ketone in 100 ml of chloroform was added portionwise 9.6 g of (85 percent) m-chloroperbenzoic acid at such a rate that the temperature did not exceed 4°. After the addition had been completed, stirring was continued for 1.5 hrs. in the cold. The reaction mixture was filtered and washed with 10 percent sodium carbonate solution and water. The chloroform solution was dried over sodium sulfate and the solvent was removed. There remained an oil which on trituration with ether afforded 8.5 g (73 percent) of a solid, mp. 91°–94°. Recrystallization from ethyl acetate gave an analytical sample, mp. 102°–103°.

Anal. Calcd for $C_{12}H_{10}N_2O_2S$: C, 58.52; H, 4.09; N, 11.37; S, 13.02. Found: C, 58.96; H, 4.09; N, 11.51; S, 12.99.

EXAMPLE 24

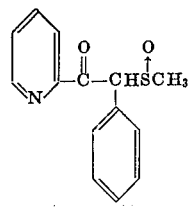

2-[(Methylsulfinyl)(phenyl)acetyl]pyridine.

To a solution of 26.5 g of ethyl picolinate and 27.0 g of benzyl methyl sulfoxide in 300 ml of benzene was added 7.5 g of sodium hydride (57 percent in mineral oil). The reaction mixture was stirred at room temperature and then warmed to initiate reaction. It was held at 75° for about 40 minutes and then stirred at room temperature for 2 ½ hours. After standing overnight, the reaction mixture was poured into 300 ml of ice water and filtered. The pH was adjusted to about 7 by the addition of 6 ml of hydrochloric acid. On cooling, there was deposited 15.6 g (35 percent of a solid m.p. 113°–116°. Recrystallization from ethyl acetate gave an analytical sample m.p. 142°–43°.

Anal. Calcd. for $C_{14}H_{13}NO_2S$: C, 64.84; N, 5.05; N, 5.40; S, 12.36. Found: C, 65.08; H, 5.07; N, 5.32; S, 12.61.

We claim:

1. A member selected from the group consisting of compounds of the formulas:

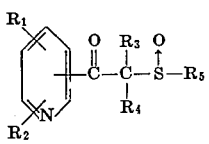 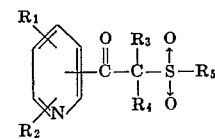

I      II wherein $R_1$ and $R_2$ are each a member selected from the group consisting of hydrogen, lower alkyl, lower alkoxy, and phenyl; $R_3$ and $R_4$ are hydrogen or one of said terms $R_3$ and $R_4$ represents phenyl; $R_5$ is a member selected from the group consisting of alkyl of up to 12 carbon atoms, phenyl, halophenyl, benzyl and pyridyl; and its pharmaceutically acceptable acid addition salts and its N-oxides.

2. A compound according to claim 1 wherein $R_1$ and $R_2$, $R_3$ and $R_4$ are hydrogen and $R_5$ is lower alkyl.

3. A compound of claim 1 which is 2-[(methylsulfinyl) acetyl]pyridine.

4. A compound of claim 1 which is 3-[(methylsulfinyl) acetyl]pyridine.

5. A compound of claim 1 which is 4-[(methylsulfinyl) acetyl]pyridine.

6. A compound of claim 1 which is 2-[(methylsulfonyl) acetyl]pyridine.

7. A compound of claim 1 which is 3-[(methylsulfonyl) acetyl]pyridine.

8. A compound of claim 1 which is 4-[(methylsulfonyl) acetyl]pyridine.

9. A compound of claim 1 which is 5-methoxy-2-[(methylsulfinyl)acetyl]pyridine.

10. A compound of claim 1 which is 2-[(methylsulfinyl) acetyl]-4-phenylpyridine.

11. A compound of claim 1 which is 5-ethyl-2-[(methyl-sulfinyl)acetyl]pyridine.

12. A compound of claim 1 which is 3-methyl-2-[(methylsulfinyl)acetyl]pyridine.

13. A compound of claim 1 which is 2-(Ethylsulfinyl)acetylpyridine.

14. A compound of claim 1 which is 2[(tert-Butylsulfinyl)acetyl]pyridine.

15. A compound of claim 1 which is 2-[(Dodecylsulfinyl)acetyl]pyridine.

16. A compound of claim 1 which is 2-[(Benzylsulfinyl)acetyl]pyridine.

17. A compound of claim 1 which is 2-[(Phenylsulfinyl)acetyl]pyridine.

18. A compound of claim 1 which is 2-[4'-Chlorophenylsulfinyl)acetyl]pyridine.

19. A compound of claim 1 which is 2-[4'-Bromophenylsulfinyl)acetyl]pyridine.

20. A compound of claim 1 which is 2-[(Pyridylsulfinyl)acetyl]pyridine.

21. A compound of claim 1 which is 2-[(Methylsulfinyl)(phenyl)acetyl]pyridine.

* * * * *